Feb. 6, 1940.　　　W. B. GRUBER　　　2,189,285
STEREOSCOPIC VIEWING DEVICE
Filed Jan. 20, 1939
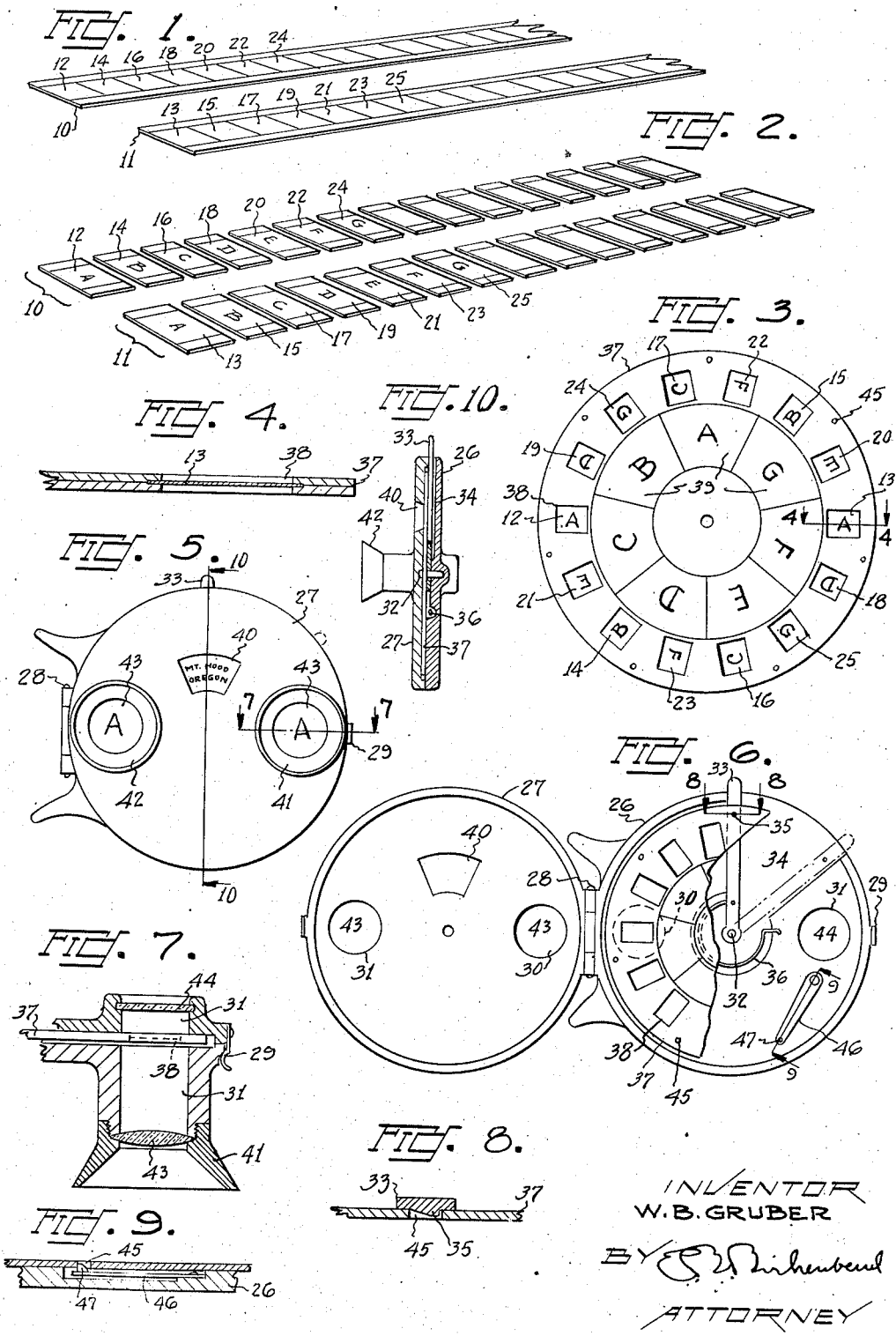
INVENTOR
W. B. GRUBER
BY
ATTORNEY Patented Feb. 6, 1940

2,189,285

UNITED STATES PATENT OFFICE 2,189,285

STEREOSCOPIC VIEWING DEVICE

Wilhelm B. Gruber, Portland, Oreg.

Application January 20, 1939, Serial No. 251,927

4 Claims. (Cl. 40—71)

This invention relates generally to photography, and particularly to a stereoscopic viewing device.

The main object of this invention is to construct a viewing device by means of which the cost of taking and showing colored pictures will be reduced to a point where they may be enjoyed by the average person without an excessive outlay.

The second object is to utilize the grainless property of Kodachrome films for the purpose of making miniature color slides.

The third object is to construct a viewing mechanism whereby a strip of stereoscopic transparencies may be arranged in repeating succession.

The fourth object is to utilize a method of and apparatus for cutting off individual frames or pictures from standard sizes of motion picture films for the purpose of viewing them stereoscopically.

The fifth object is to apply any size of miniature film transparency onto a perforated disk which brings successive views into the field of vision through the perforations continuously right side up by the rotation of the disk.

The sixth object is to provide a unique form of viewing mechanism including a special form of transport lever for operating the disk in a manner to place the respective stereoscopic views automatically into proper viewing positions thereby permitting seven or more or less stereoscopic pictures to be viewed in succession.

The seventh object is to provide a device of the class described wherein is included a means for indicating the titles of the various views.

These and other objects are accomplished in the manner set forth in the following specification, as illustrated in the accompanying drawing, in which:

Fig. 1 is a fragmentary perspective view showing two motion picture films adapted to be run through a stereoscopic camera.

Fig. 2 is a view similar to Fig. 1 but showing the films cut up into their respective squares.

Fig. 3 is a front elevation of the film carrying disk.

Fig. 4 is a section taken along the line 4—4 in Fig. 3.

Fig. 5 is a front elevation of the viewer showing a pair of coordinated views and the corresponding title being displayed therewith.

Fig. 6 is a front elevation of the viewer showing the cover swung to an open position.

Fig. 7 is a large fragmentary section taken along the line 7—7 in Fig. 5.

Fig. 8 is a fragmentary section taken along the line 8—8 in Fig. 6.

Fig. 9 is a section taken along the line 9—9 in Fig. 6.

Fig. 10 is a section taken along the line 10—10 in Fig. 5.

Similar numerals refer to similar parts throughout the several views.

Referring in detail to the drawing, there is shown a pair of film strips 10 and 11 which are assumed to have been exposed in a stereoscopic camera of a type in which the frames 12 and 13 unite to form a composite view and the frames 14 and 15 unite to form the next succeeding view et cetera down to the frames 24 and 25.

In Fig. 2 the strips 10 and 11 are cut into their individual frames.

Referring particularly to the viewer mechanism, same will be seen to consist of a hinged casing comprised of the parts 26 and 27 which are joined by means of the hinge 28 and held in a closed position by means of a latch 29. The case portion 26 is provided with a pair of openings 30 and 31 equi-distant from the central pivot 32 on which is pivotally mounted the transport lever 33 which is capable of rocking to and fro in the recess 34.

The transport lever 33 is in the form of a spring and has a laterally projecting point 35 disposed thereon. The transport lever 33 is urged in one direction by means of the spring 36 which is attached to the transport lever 33 and to the case 26.

Mounted on the pivot 32 are the disks 37 within whose apertures 38 are the transparencies illustrated in Fig. 2.

It will be noted in Fig. 3 that the transparency 12 is directly opposite the transparency 13 and that the transparency 14 is directly opposite the transparency 15 et cetera around the disk 37. In order to illustrate the device I have shown letters from A to G in the transparencies showing the letter in the relative position which the picture would appear in the transparency.

It will be noted that in Fig. 3, for example, at the left side of the disk 37 the letter A is upright in the transparency 12. The letter E is inverted in the transparency 20 and the letter B is upright in the transparency 14, etc. That is, the letters do not follow each other in alphabetical succession but alternate as shown and at the same time they are inverted.

It will also be noted that the letters A to G inclusive are shown in the segments 39 just inside of the apertures 38. A window 40 is formed in the member 27 to register with the letter A in the segment 39 when the letters A or the corresponding transparencies 12 and 13 appear in the openings 30 and 31.

While I have shown letters from A to G in the segments 39, it must be understood that this is for the purpose of illustration only. In actual practice the space occupied by the letters is used for printed matter, namely, the titles of the various pictures. For example, when the letter A appears in the window 40, the corresponding transparencies 12 and 13 would appear in their respective openings making it possible for the viewer to ascertain easily the correct title of the view. It will be noted that use is made of the large inner portion of the disk which would otherwise be useless.

Over the openings 30 and 31 are placed the eye pieces 41 and 42 each of which is provided with the lenses 43 and ground glass 44.

The disk 37 is provided with the index holes 45 which can register with the point 35 on the laterally yieldable transport lever 33. A spring pawl 46 is mounted on the member 26 and its point 47 can also engage the holes 45 and prevent the backward rotation of the disk 37.

The operation of the device is as follows:

Assuming that the transparencies have been made by exposing the stereoscopic films of small dimension and then severing them as shown in Fig. 2 and then mounting the pairs of transparencies in alternate apertures 38, the pictures may now be viewed by simply operating the transport lever 33 which is spring returned and at each movement causes the disk 37 to revolve through two of its transparency spacings. It is desirable to have the center diameter of the aperture spacings 38 approximately the width of the average eyes, namely, 65 millimeters apart. Obviously, this can be varied considerably by the use of binocular lenses.

As shown, the device is capable of presenting seven views in succession by moving the disk 37 to spaces at each operation of the lever 33 which brings it back to the point of beginning without producing an inverted image.

Obviously, the details of this invention may be varied greatly without departing from the spirit thereof.

I claim:

1. A disk of the class described having fourteen windows formed therein in each of which is mounted a transparency, means for viewing a pair of diametrically opposite transparencies simultaneously, means for moving said disk to expose in alternate succession whereby a cycle of views can be shown in repeated succession without inversion.

2. A disk of the class described having fourteen transparency windows formed around the center thereof, alternate windows having parts of stereoscopic views mounted therein in an upright manner, the intermediate windows having a following sequence of views in inverted order.

3. A film viewing device consisting of a revolvable aperture disk, a casing for enclosing said disk, a pair of viewing lenses mounted on said casing whose line of sight is adapted to register with a pair of opposite disk apertures, said disk being characterized by having successive pairs of stereoscopic views disposed in opposite windows in alternating succession.

4. In a device of the class described a viewing disk having a plurality of apertures formed therein in a concentric circles about the center thereof, means for viewing transparencies mounted in opposite perforations simultaneously, a transport mechanism for moving said disk through two of its spaces at each operation, and having titles of the various views arranged concentrically about the center of the device and means for exposing one of said titles when its corresponding transparencies are being viewed.

WILHELM B. GRUBER.